Feb. 3, 1970  J. E. RAMSEY, JR., ET AL  3,493,862
INDUCTION METER HAVING LIGHT-LOAD ADJUSTER
Filed March 28, 1968

WITNESSES:
Bernard R. Giegney
Leon M. Garman

INVENTORS
James E. Ramsey, Jr. &
William J. Zisa.
BY
C. L. Freedman
ATTORNEY

United States Patent Office 3,493,862
Patented Feb. 3, 1970

3,493,862
INDUCTION METER HAVING LIGHT-LOAD ADJUSTER
James E. Ramsey, Jr., Raleigh, and William J. Zisa, Cary, N.C., assignors to Westinghouse Electric Corporation, Pittsburgh, Pa., a corporation of Pennsylvania
Filed Mar. 28, 1968, Ser. No. 716,875
Int. Cl. G01r 11/02
U.S. Cl. 324—137       17 Claims

ABSTRACT OF THE DISCLOSURE

The voltage winding of an induction meter directs voltage magnetic fluxes through the armature of the meter and through two magnetic paths having reluctances. These fluxes affect oppositely the light-load performance of the meter. The reluctances are adjustable in opposite directions in order to adjust the light-load performance of the meter.

Cross reference

Certain subject matter shown herein is covered in the copending patent application of James E. Ramsey, Jr., Ser. No. 648,905, filed June 26, 1967, and assigned to the same assignee.

Background of the invention

This invention relates to induction measuring devices and it has particular relation to induction measuring devices which are responsive to a function of the product of two variable quantities.

Aspects of the invention are applicable to induction devices, particularly those which are responsive to a function of volt-amperes. Such induction devices may be employed for indicating or integrating functions of volt amperes such as vars or watts which are dependent on the product of voltage and current present in an alternating electrical circuit. The invention is particularly suitable for induction-type watthour meters and will be described with reference to such meters.

In a conventional induction-type watthour meter a voltage magnetic flux derived from a voltage winding and a current magnetic flux derived from current windings produce a shifting magnetic field in the air gap for driving an electro-conductive armature. The response of the armature is dependent on the magnitudes and phase relationship of these magnetic fluxes.

In the prior art it was conventional to adjust the light-load performance of the meter by means of a movable electro-conductive member. This adjustment had a side effect on the phase relationship of the magnetic fluxes.

In an attempt to eliminate the side effect magnetic light-load adjusters were proposed, one example being shown in Patent 2,947,942. These were subject to several limitations such as insufficient range, asymmetric range, inconvenience, and bumpy action.

Summary of the invention

In accordance with the invention magnetic arms are biased against two auxiliary voltage poles in the paths of voltage magnetic fluxes supplied to the meter armature on opposite sides of the armature axis. These fluxes produce opposed light-load torques acting on the armature. The arms are pivotally mounted for movement to adjust the light-load performance of the meter.

It is therefore an object of the invention to provide an improved induction device which is accurate at light load.

It is also an object of the invention to provide an induction type watthour meter which has an improved magnetic adjustment dependent on the voltage magnetic flux for establishing a desired light-load calibration of the meter.

Other objects of the invention will be apparent from the following description taken in conjunction with the accompanying drawing, in which.

Figure 1:
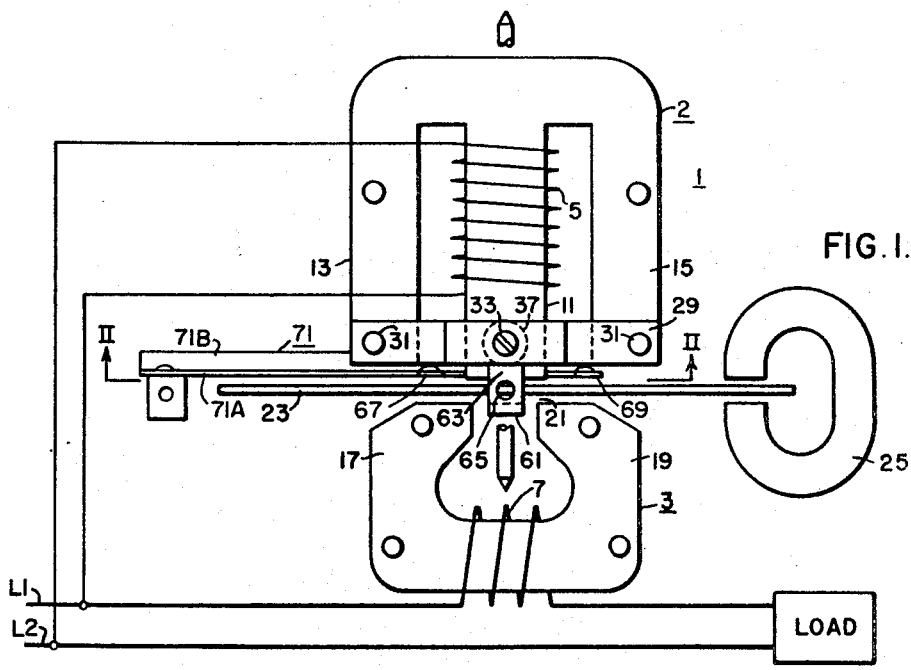
FIG. 1 is a schematic view with parts shown in elevation of a watthour meter system embodying the invention.

Referring to the drawing, FIG. 1 shows a watthour meter 1 for measuring energy supplied over an alternating current circuit represented by the conductors L1 and L2. Although this circuit may be a three-wire single-phase circuit or a polyphase circuit it will be assumed that it is a two-wire alternating-current circuit operating at a frequency of 60 cycles per second for transmitting electric energy from a line to a load. The watthour meter 1 includes a stator or electromagnet assembly which comprises a voltage magnetic section 2, a current magnetic section 3, and a voltage winding or coil 5. The magnetic sections are constructed of laminations of soft magnetic material such as silicon iron. The voltage section 2 is E-shaped and has a voltage pole 11 and two outer legs 13 and 15. The voltage coil 5 surrounds the voltage pole 11.

The current magnetic section has two current poles 17 and 19 which are spaced from the voltage pole 11 to define an air gap 21. The current poles 17 and 19 are formed by U-shaped laminations. A current winding 7 surrounds a portion of the U-shaped laminations. The voltage coil 5 has a large number of turns of copper conductor of small diameter whereas the current winding 7 may be constructed of a relatively small number of turns of large-diameter copper conductor. It will be noted that the voltage pole 11, legs 13 and 15 and the current poles 17 and 19 all lie substantially in a common plane.

An electro-conductive armature in the form of a disc 23 has a portion positioned in the air gap 21 and is mounted for rotation about the axis of the disc. A portion of the disc also is located in the air gap of a permanent magnet 25 for damping purposes. The construction of the watthour meter as thus far specifically set forth is well known in the art.

When the voltage coil 5 and the current winding 7 are properly energized from the conductors L1 and L2, a shifting magnetic field is produced in the air gap 21 which develops a torque acting between the disc 23 and the electromagnet for the purpose of producing rotation of the disc 23 about its axis. The rotation of the disc 23 is dependent on the product of the voltage between the conductors L1 and L2, the current flowing through the conductors and the phase displacement between such current and voltage. Rotation of the disc 23 may be employed in any suitable manner for indicating energy supplied over the conductors L1 and L2 as by operating a conventional register (not shown).

In order to adjust the phase relationship between the working voltage magnetic flux and the voltage supplied to the voltage winding a leakage path is established for voltage flux produced by the winding 5. This leakage path is linked by an electro-conductive material in the manner set forth in Patent 3,212,005, filed Oct. 12, 1965.

Figure 2:
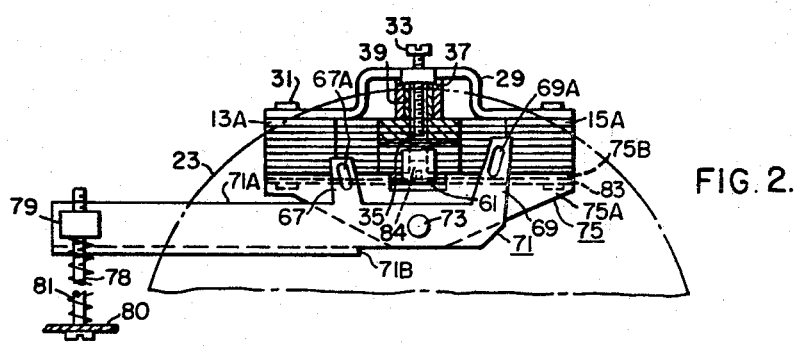
FIG. 2 is a sectional view taken along the line II—II of FIG. 1.
Figure 4:
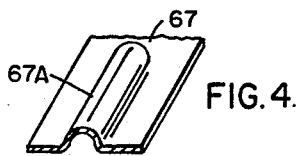
FIG. 4 is a detail view in perspective of a part of adjuster arm.
Figure 3:
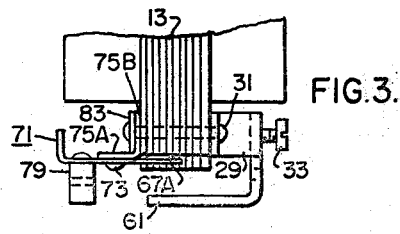
FIG. 3 is a view in end elevation of a portion of the meter of FIGS. 1 and 2.

As shown in FIGS. 1 and 2 the leakage path takes the form of a bracket 29 constructed of a soft magnetic material such as cold rolled steel. This bracket has its ends secured respectively to the outer edges 13 and 15 in any suitable manner as by rivets 31. It will be noted that this bracket extends across the free end of the voltage pole 11 and is spaced from such pole.

At a central point the bracket has a threaded opening for receiving a machine screw 33 constructed of a soft magnetic material such as soft magnetic steel. The tip of this screw may extend into an opening 35 provided in the voltage pole 11.

The bracket 29 and the screw 33 establish a path for leakage magnetic flux derived from the voltage coil 5 which extends from the voltage pole 11 to the screw 33. From the screw 33 the path continues through two parallel branches formed by two halves of the bracket 29 to the outer legs 13 and 15. The amount of leakage magnetic flux passing through this magnetic path may be adjusted by rotating the screw 33 to alter its axial position relative to the voltage pole 11.

The magnetic path formed by the screw 33 and the bracket 29 is employed for adjustably loading the voltage coil 5. To this end an electro-conductive member is positioned to be linked by magnetic flux passing through the magnetic path. In the embodiment of FIG 2 the electro-conductive member takes the form of a tube 37 which may be constructed of copper and which is concentric with the screw 33.

In effect the tube 37 constitutes a closed secondary winding for a transformer in which the primary winding is represented by the voltage coil 5. Losses due to current flowing in the tube 37 are reflected back to the voltage coil 5. The loading is adjusted by manipulation of the screw 33 and is employed for adjusting the angle by which magnetic flux derived from the voltage coil 5 lags the voltage applied to the coil. By this expedient the working voltage magnetic flux applied by the voltage coil 5 to the air gap 21 and the armature 23 may be brought into quadrature with the current magnetic flux applied by the current winding 7 to the air gap when the watthour meter is operating to measure a unity power factor load.

Class II temperature compensation for the watthour meter may be provided as set forth in the aforesaid patent. As shown in FIG. 2 a sleeve 39 of an austenitic iron nickel alloy having approximately 30% nickel is concentric with, and intermediate, the screw 33 and the tube 37. Such a sleeve has a substantial negative temperature coefficient of permeability over the range of temperatures to which watthour meters are normally subjected in operation.

In order to improve the efficiency of the watthour meter a soft magnetic tongue 61 is located intermediate the pole faces of the current poles 17, 19 with its upper face in substantially the same plane as such pole faces. This tongue is connected through a soft magnetic element 63 to the mid part of the bracket 29. The tongue 61, the element 63 and the bracket 29 are integrally constructed from a sheet of soft magnetic material.

The tongue 61 is spaced from the pole face of the voltage pole 11 to define an air gap in which the armature 23 is located. Working voltage magnetic flux enters this air gap from the voltage pole and then passes through the tongue 61, the element 63, the bracket 29, and the two legs 13 and 15 in parallel back to the voltage pole 11.

The structure thus far specifically described provides good performance. However, the accuracy has been found to fall off when the voltage coil 5 is energized by a reduced voltage. For example, the voltage coil 5 may be designed for energization by a voltage within the range of 240 volts or less. Assuming that the accuracy is 100% when the voltage coil is energized by the full voltage or 240 volts, it has been found that when the voltage coil is energized by half voltage or 120 volts the meter runs slightly slow and the accuracy drops to 99% or 98% at 50% lagging power factor. Although such accuracy is adequate for a number of applications of the watthour meter an improvement in such accuracy is desirable.

The path followed by the working voltage magnetic flux is designed to saturate within the range of rated voltage for which the watthour meter is designed. Conveniently the element 63 may be given a cross section such that it is saturated when the voltage coil is energized by 240 volts. However, when the voltage coil is energized by 120 volts the cross section is not saturated. This construction may be proportioned to provide a substantially uniform accuracy of the watthour meter over the voltage range from 240 volts to less than 120 volts.

In FIG. 1 the desired cross section of the element 63 is provided by a hole 65 which extends through the element to decrease its cross section. Such a hole provides the desired reduction in cross section while assuring adequate rigidity of the parts.

In order to provide light-load calibration of the meter recourse is had to the auxiliary voltage pole faces 13A and 15A which the legs 13 and 15 present across the air gap 21 from the current poles. Magnetic voltage fluxes passing through these pole faces enter the armature 21 and produce auxiliary torques acting on the armature in opposite directions and effective under light-load conditions. Thus, as long as these torques are balanced they apply no resultant torque to the armature.

Light-load calibration of the meter is effected by controlling the balance between the auxiliary torques. To this end soft magnetic arms 67 and 69 are biased respectively against the pole faces 13A and 15A respectively. If the arms are positioned to balance the auxiliary torques the magnetic fluxes supplied through these pole faces have no resultant effect on the torque applied to the armature. If the arm 67 is moved downward in FIG. 2 and the arm 69 is moved upward from the balance or neutral positions, an unbalance results which applies a resultant torque acting on the armature in a first direction. If the movements of the arms are in the reverse directions the unbalance applies a resultant torque acting on the armature in a second direction opposite to the first direction.

Although the arms could be positioned independently of each other preferably they are both connected to a lever or member 71 which is pivotally mounted by a rivet 73 on the horizontal flange 75A of a bracket 75 for rotation about a vertical axis. The bracket 75 has a vertical flange 75B secured to the voltage section. Although the member 71 may be constructed of non-magnetic material preferably the member and the arms 67 and 69 are constructed integrally of soft magnetic sheet material such as steel. The member 71 includes a part 71A in a horizontal plane from which the arms project and a vertical flange 71B which stiffens the member.

Adjustment of the arms 67 and 69 is effected through a nut 79 which is pivotally mounted on the free end of the member 71 for rotation about a vertical axis. A headed screw 78 passes through an opening in a fixed structure 80 secured to the stator of the meter and is in threaded engagement with the nut. A helical spring 81 surrounds the screw and is compressed between the nut 79 and the structure 80. Thus the spring biases the member 71 about the axis of the rivet 73 in a clockwise direction as viewed in FIG. 2. The screw 78 has a screw-driver slot and may be rotated from the front of the meter for light-load calibration.

Inasmuch as the bracket 75 is of non-magnetic material, such as brass or aluminum, its vertical flange 75B may serve as a non-magnetic spacer for a soft magnetic shunt 83, which may be of steel strap, extending adjacent the free ends of the voltage pole 11 and the legs 13 and 15. Also, further non-magnetic spacing from the center of the voltage pole 11 may be provided by a brass or aluminum headed stud 84 inserted in opening 35 of voltage pole 11 opposite to the side facing the tip of screw 33. The stud 84 has a body within the opening 35 and a head larger in diameter than the opening, the head acting to space the shunt from the voltage pole. By replacing the stud by one having a thicker head the shunt is forced further away from the pole to decrease its shunting effect. The rivets 31, which are of non-magnetic material such as brass or aluminum, pass through holes in the shunt 83, the flange 75A, the laminations of the legs 13 and 15 and the bracket 29 to unite securely these parts.

Each of the arms 67 and 69 is biased against the associated pole face 13A or 15A by the inherent resiliency of the material of which the arms and the member 71 are formed. In order to assure smooth movement of the arms over the pole faces each arm has an elongated projection 67A or 69A extending towards the associated pole face. Each projection is formed by molding the material of the associated arm and is long enough to bridge several laminations of the associated pole face, essentially with a line contact.

In the neutral or balanced positions of the arms 67 and 69 they bridge unequal areas of their associated pole faces. This is because of the asymmetric construction of the member 71. It is for this reason that the arm 67 is shown shorter than the arm 69. As shown in FIG. 2 the arms are on one side of a plane containing the axis of the electromagnet. With the illustrated construction the load-adjustment range is symmetrical with the relative physical position of the member 71.

If the light-load performance of the meter is inaccurate the screw 78 is adjusted or rotated for the purpose of moving the arms 67 and 69 in opposite directions across the associated pole faces. This in effect magnetically shifts the voltage magnetic flux field in the air gap in either direction dependent on the direction of rotation of the screw. The screw is rotated in a direction and to an extent suitable for providing light-load calibration.

We claim:

1. An alternating-current induction motor device comprising voltage magnetic means having first and second magnetic pole pieces disposed essentially in a first common plane said pole pieces having pole faces disposed substantially in a second common plane substantially transverse to the first common plane, voltage winding means effective when energized from an alternating source for directing voltage magnetic flux through said pole faces to establish alternating magnetic fields adjacent the pole faces, and adjusting means for modifying the distribution of said magnetic fields, said adjusting means comprising first and second magnetic arms located in positions intercepting magnetic flux passing between said respective pole faces and said magnetic fields, and operating means operable for adjusting said magnetic arms in directions substantially transverse to said first common plane, the operation of the operating means changing in opposite directions the amounts of magnetic flux intercepted by the respective arms.

2. A motor device as claimed in claim 1 wherein said operating means comprises a magnetic member, said arms and member being constructed integrally of soft magnetic material.

3. A motor device as claimed in claim 2 wherein mounting means mounts said member for pivotal movement relative to said pole pieces about an axis parallel to the first common plane and transverse to the second common plane, each of said arms in one position of the operating means extending only partly across its associated pole face in one direction of movement of such arm.

4. A motor device as claimed in claim 3 wherein said arms are self-biased relative to the mounting means into engagement with the pole faces.

5. A motor device as claimed in claim 3 wherein said mounting means comprises a bracket extending between and secured to said pole pieces, and means rotatably mounting said member on said bracket.

6. A motor device as claimed in claim 5 wherein said voltage magnetic means includes a third magnetic pole piece located between the first and second magnetic pole pieces to form an E configuration, said bracket being of non-magnetic material, and a magnetic shunt extending between said first and second magnetic pole pieces adjacent to said third magnetic pole pieces, said bracket spacing the shunt from the first and second pole pieces, said winding means establishing magnetomotive forces between the pole face of the third magnetic pole piece and the pole faces of the first and second magnetic pole pieces in parallel.

7. A motor device as claimed in claim 6 in combination with a spacer in the form of a pin having a non-magnetic head thereon, said third magnetic pole piece having a hole to receive said pin with the head of the pin located between the third magnetic pole piece and the shunt to space the shunt from such pole piece.

8. A motor device as claimed in claim 1 wherein said voltage magnetic means comprises a plurality of similar laminations parallel to the first common plane and secured to each other, each of said arms having a protuberance establishing an engaging edge extending in the directions of adjustment of such arm and bridging at least two of said laminations.

9. A motor device as claimed in claim 1 wherein said voltage magnetic means includes a third magnetic pole piece located between the first and second magnetic pole pieces to form an E-configuration, said winding means establishing magnetomotive forces between the pole face of the third magnetic pole piece and the pole faces of the first and second magnetic pole pieces in parallel, a C-shaped current magnetic means having pole pieces disposed parallel to said first common plane and having pole faces spaced from the pole faces of the first, second and third magnetic pole pieces to establish an air gap therebetween, current winding means effective when energized with the voltage winding means from an alternating current source for establishing a magnetomotive force between the pole faces of the current magnetic means to establish with the voltage magnetic means a shifting magnetic field in the air gap, and an electro-conductive armature mounted for rotation relative to the magnetic means and having a portion disposed in the air gap for rotation by the shifting magnetic field.

10. A motor device as claimed in claim 9 which constitutes an induction watthour meter wherein said operating means comprises a magnetic member, said arms and member being constructed integrally of soft magnetic material, said arms having areas of reduced cross-section biased into engagement with the pole faces of the first and second pole pieces.

11. The motor device claimed in claim 10 wherein said voltage magnetic means comprises plural similar laminations parallel to the first common plane, said areas bridging at least two of said laminations.

12. The motor device claimed in claim 9 wherein said operating means comprises a magnetic member, said member and arms being constructed integrally of soft magnetic material, a bracket extending between and secured to the first and second magnetic pole pieces, means pivotally mounting said member on said bracket to guide said arms in said directions, said member having an operating extension projecting substantially parallel to said first common plane in one position thereof from one of the arms in a direction away from the other one of said arms, the arm adjacent said extension overlying a smaller portion of its associated pole face than the other arm when the extension occupies said one position to provide a substantially balanced light-load effect on the armature, whereby positive and negative adjustments of the extension are substantially balanced about said one position, each of said arms overlying a fraction only of the associated pole face in one direction of movement of such arm.

13. The motor device of claim 12 wherein a swivel nut is swivel mounted on said extension, a screw in threaded engagement with said nut and rotatably mounted relative to the magnetic means for rotation about an axis substantially transverse to the first common plane, means preventing axial movement of the screw relative to its mounting in one direction, and spring means taking up all lost motion between the screw mounting and the nut.

14. A motor device as claimed in claim 12 wherein said bracket is of non-magnetic material, a soft magnetic shunt extending between the first and second magnetic pole pieces and spaced from such pole pieces by said bracket.

15. A motor device as claimed in claim 14 wherein said shunt passes adjacent said third magnetic pole piece, said third magnetic pole piece having an opening adjacent said shunt, and a non-magnetic headed spacer having a body part releasably positioned within the opening and having a headed part spacing the shunt from the third magnetic pole piece, whereby said spacer may be selected having a head thickness proportioned to provide a desired shunting effect by the shunt.

16. The motor device as claimed in claim 9 which constitutes an induction watthour meter wherein said operating means comprises a soft magnetic member which is located in front of the voltage magnetic means, each of said arms extending integrally from the magnetic member over a portion only of the associated pole face of the first and second magnetic pole pieces in a direction substantially transverse to the magnetic member, a bracket fixed relative to the first and second magnetic pole pieces and positioned in front of the voltage magnetic means, means pivotally mounting the magnetic member on the bracket for rotation about a reference axis parallel to the axis of the armature, whereby rotation of the magnetic member about the reference axis moves one of the arms to overlie a larger part of the associated pole face and simultaneously moves the other of the arms to overlie a lesser part of the associated pole face to alter the resultant torque applied to the armature by the arms, and means operable from in front of the voltage magnetic section for adjusting the position of the magnetic member.

17. The motor device as claimed in claim 16 wherein said magnetic member and arms are constructed of soft-magnetic-resilient material for inherently biasing the arms against their associated pole faces.

References Cited
UNITED STATES PATENTS

| | | | |
|---|---|---|---|
| 2,119,015 | 5/1938 | Kurz | 324—137 XR |
| 2,947,942 | 8/1960 | Morong | 324—137 |

ALFRED E. SMITH, Primary Examiner